US006266684B1

(12) United States Patent
Kraus et al.

(10) Patent No.: US 6,266,684 B1
(45) Date of Patent: Jul. 24, 2001

(54) CREATING AND SAVING MULTI-FRAME WEB PAGES

(75) Inventors: William F. Kraus, Moss Beach; Emily E. Clarke, San Mateo, both of CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 08/907,165

(22) Filed: Aug. 6, 1997

(51) Int. Cl.[7] .................................................. G06F 15/00
(52) U.S. Cl. ........................ 707/513; 707/501; 707/509; 707/517; 345/340
(58) Field of Search .................... 707/520, 513, 707/500, 501, 517, 509; 345/339, 342, 340

(56) References Cited

U.S. PATENT DOCUMENTS

| 5,089,990 | * | 2/1992 | Saito | 395/375 |
| 5,276,792 | * | 1/1994 | Masaki | 395/146 |
| 5,379,373 | * | 1/1995 | Hayashi et al. | 395/148 |
| 5,553,217 | * | 9/1996 | Hart et al. | 395/148 |
| 5,633,996 | * | 5/1997 | Hayashi et al. | 395/774 |
| 5,721,852 | * | 2/1998 | Porter | 395/349 |
| 5,860,073 | * | 1/1999 | Ferrel et al. | 707/522 |
| 5,918,010 | * | 6/1999 | Appleman et al. | 395/200.33 |
| 6,003,047 | * | 12/1999 | Osmond et al. | 707/513 |
| 6,009,429 | * | 12/1999 | Greer et al. | 707/10 |
| 6,031,983 | * | 2/2000 | Cordell | 395/701 |
| 6,061,696 | * | 5/2000 | Lee et al. | 707/513 |
| 6,061,699 | * | 5/2000 | DiCecco et al. | 707/513 |
| 6,112,216 | * | 12/1999 | Pratley et al. | 707/509 |

OTHER PUBLICATIONS

Stern, Content Providers: "I was Framed", rstern@ablondifoster.com, Jun. 1997.*
Oliver, Netscape 2 Unleashed, Sams.net Publishing, pp. 408–413, Feb. 1996.*
Microsoft Word 97, Screen Printouts, pp. 1–6, Apr. 1997.*
Lemay, FrontPage 97, Sams.net Publishing, pp. 328–335, Jan. 1997.*
Lemay, FrontPage 97, Sams.net Publishing, pp. 314–339, 1997.*
Brown, Using Netscape 2, Que Corporation, pp. 75, 76, 150, 151, 156–157, 1995.*
Oliver, Netscape 2, Unleashed, Sams.net Publishing, pp. 408–413, 743, 744, 1996.*
SoftQuad, HotMetal Pro 3.0, SoftQuad Inc., pp. 69–75, 97, 1996.*
Microsoft Excel 97, Microsoft Corporation, pp. 1–3, Jun. 6, 1997.*

* cited by examiner

Primary Examiner—Heather Herndon
Assistant Examiner—Cong-Lac Huynh
(74) Attorney, Agent, or Firm—Fish & Richardson P.C.

(57) ABSTRACT

A web page authoring program allows a user to create a multiple frame web page by manipulating a graphical display representing the web page. The program presents a graphical display representing how the web page will appear when viewed through a web browser and allows the user to manipulate the graphical display directly to divide the web page into multiple frames. The program also allows the user to target a frame in the web page to display a particular web resource when the page is viewed through a web browser. In this regard, the program presents a graphical image representing the frameset structure of the web page and allows the user to target a frame by selecting a corresponding portion of the graphical image with a pointing device. In saving a portion of the web page, the program presents a miniature graphical image representing the structure of the web page and including a highlighted portion representing the portion of the web page to be saved and, in response to an instruction provided by the user, saves the portion of the web page in a storage medium.

36 Claims, 8 Drawing Sheets

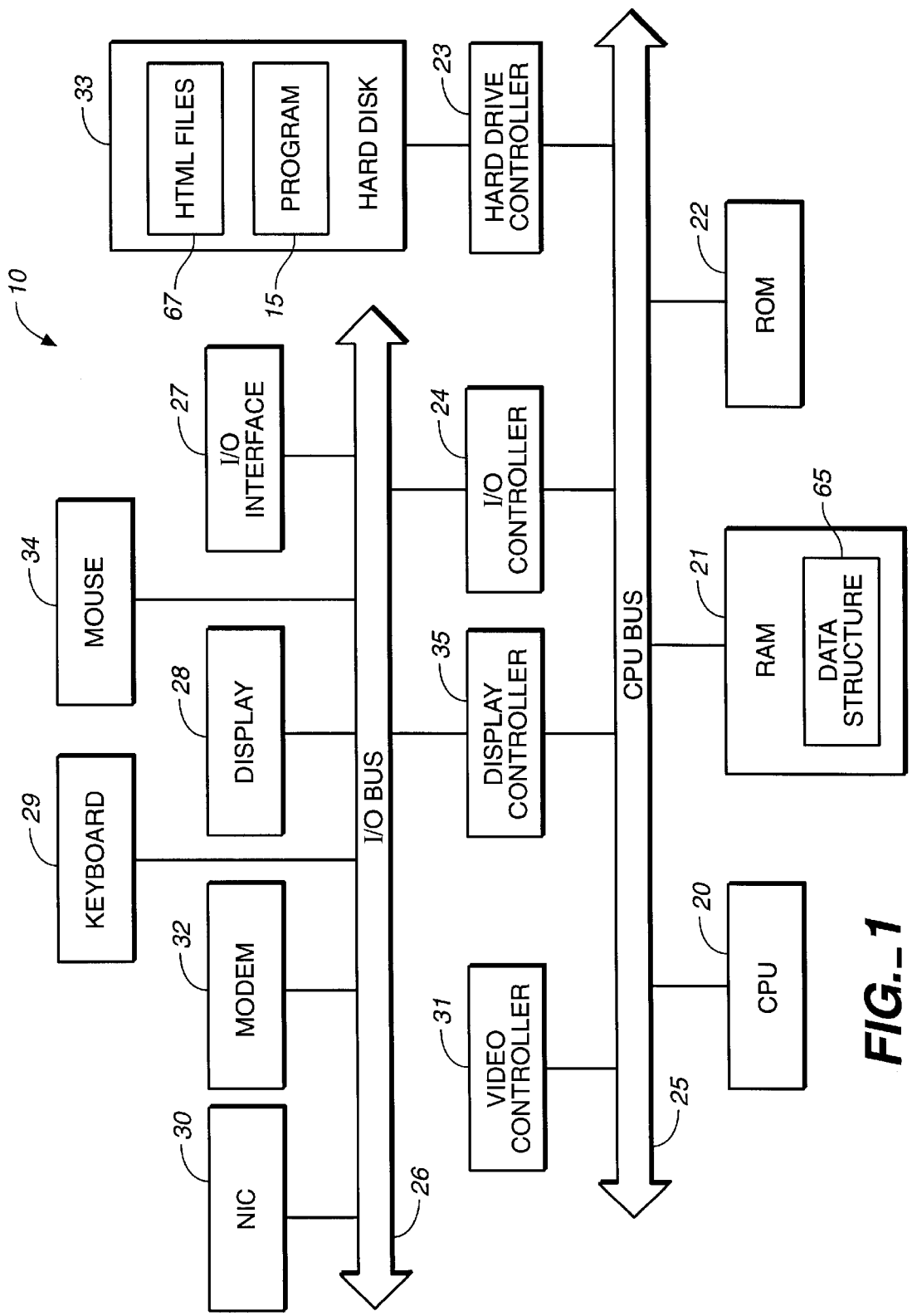
FIG._1

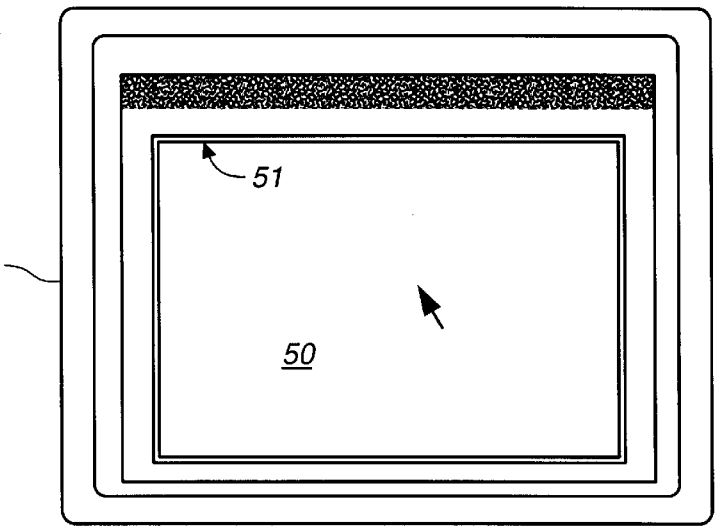
FIG._2
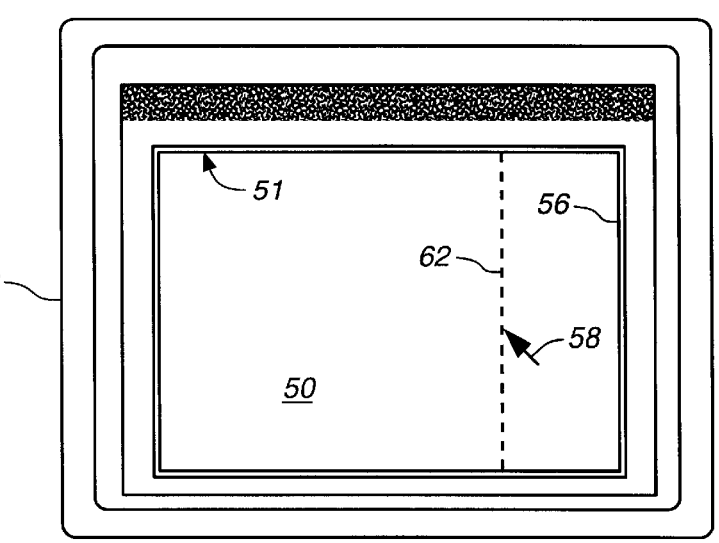
FIG._3
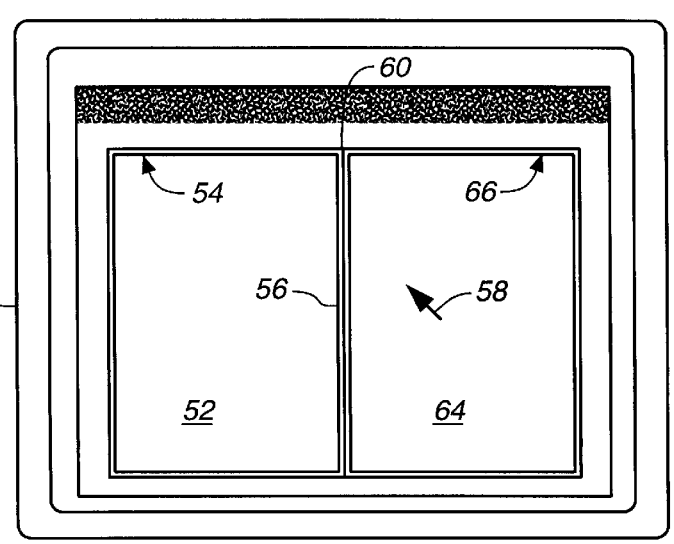
FIG._4

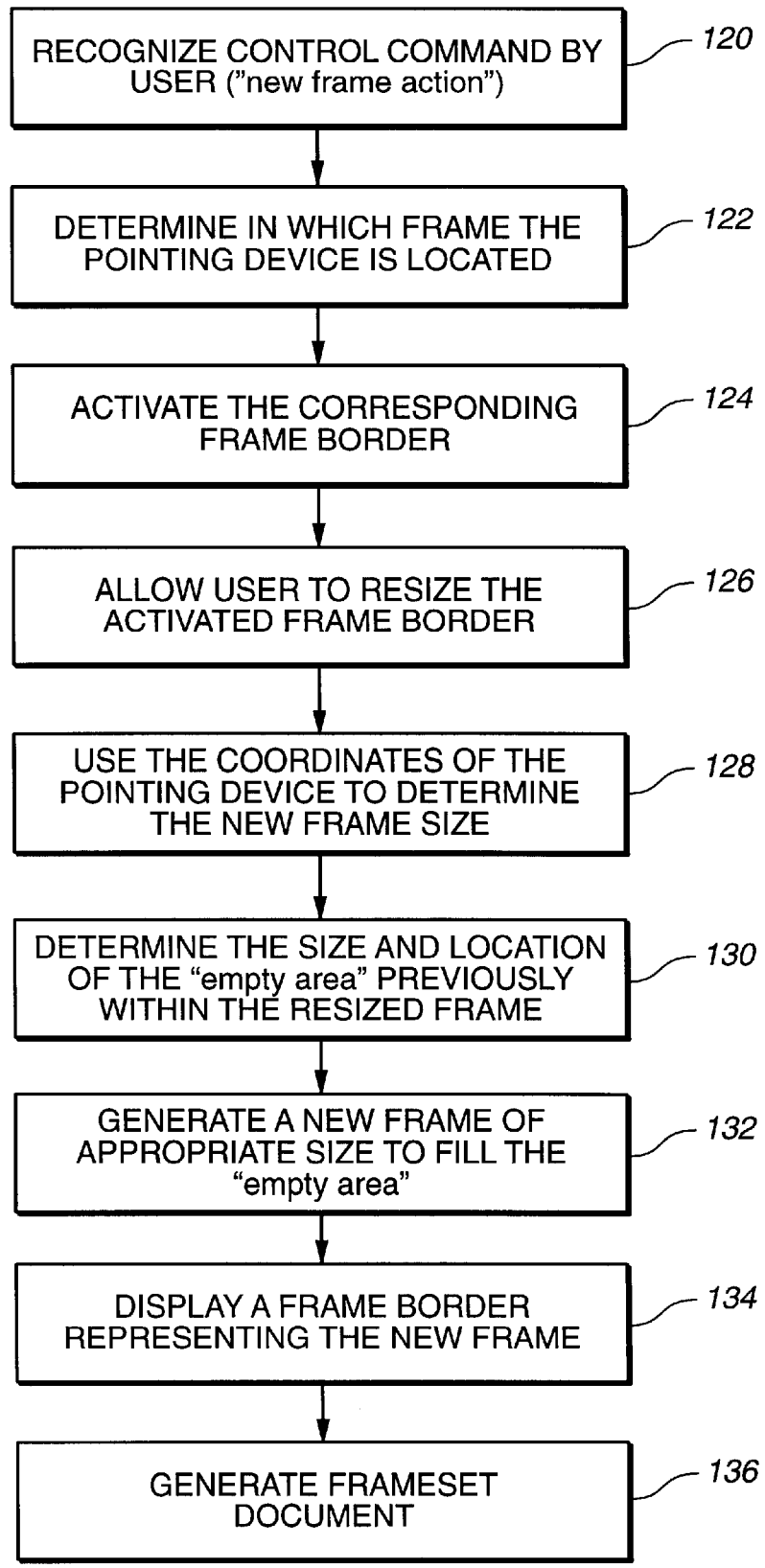
FIG._5

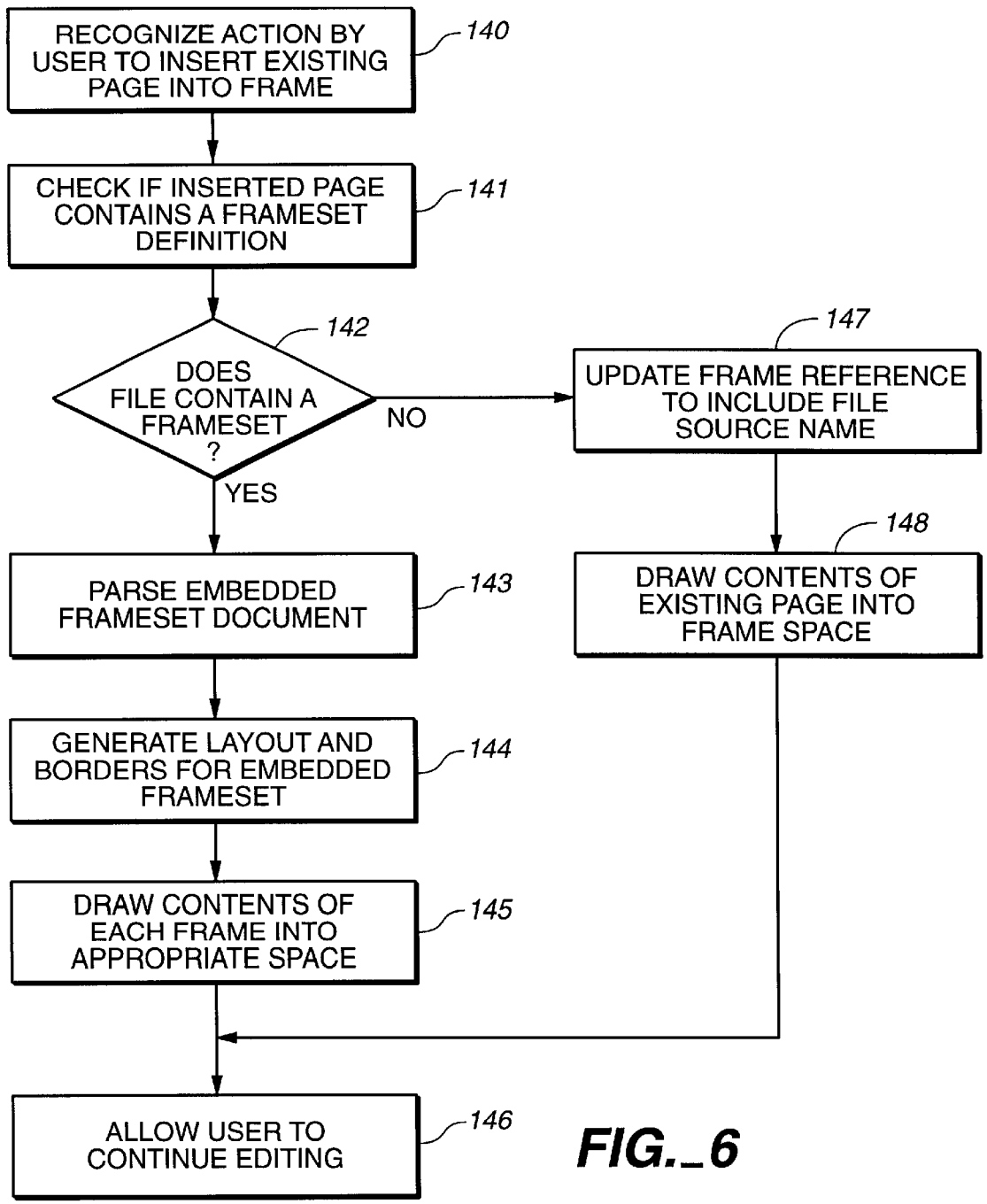
FIG._6

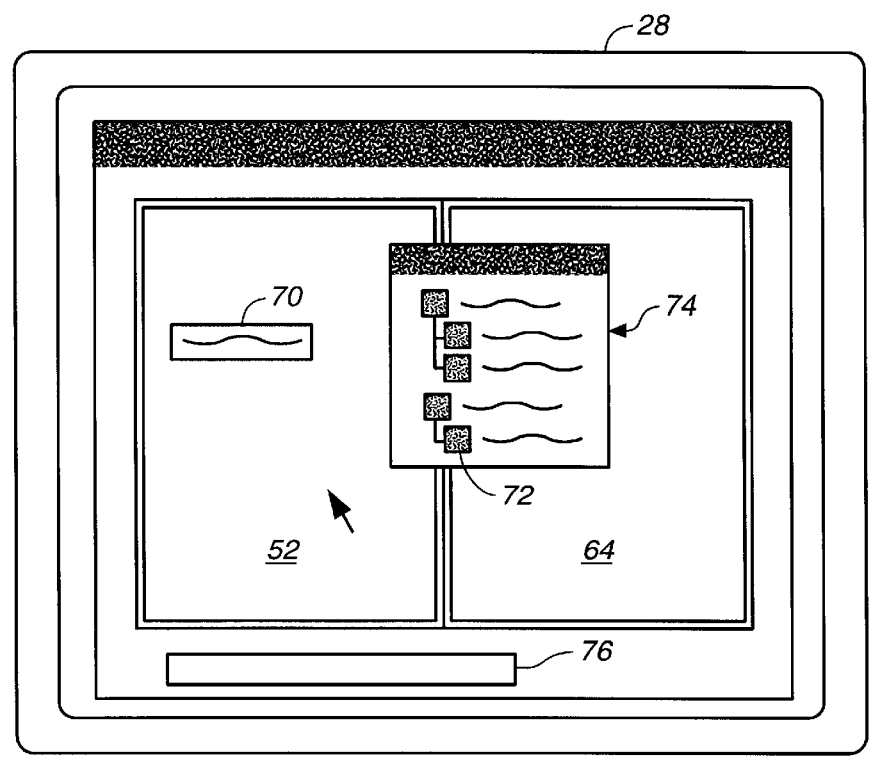
FIG._7
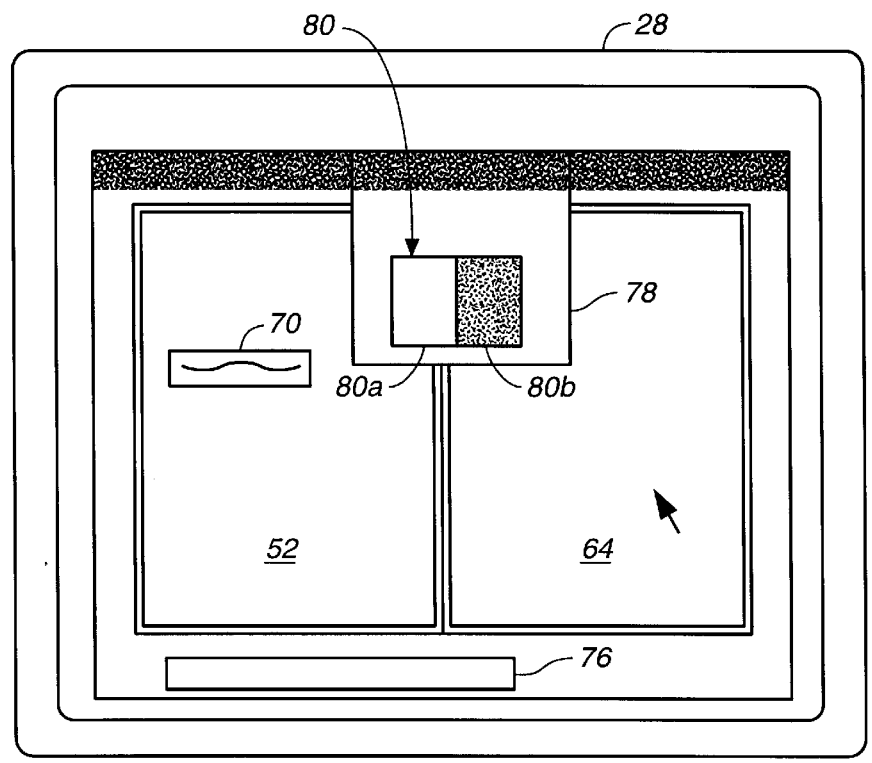
FIG._8

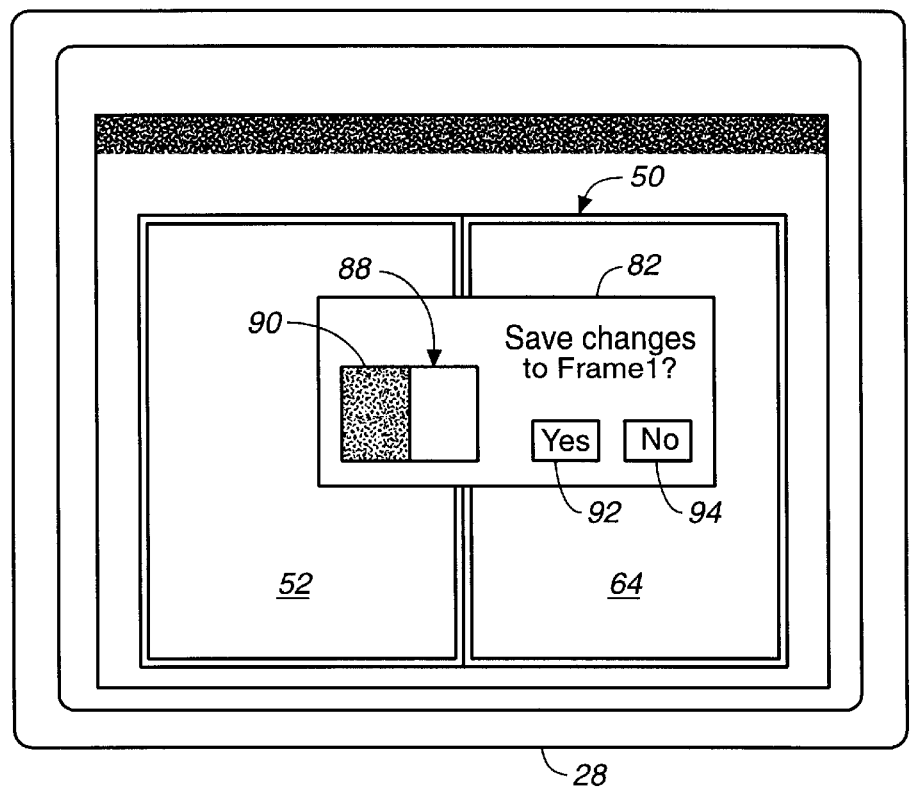
FIG._9
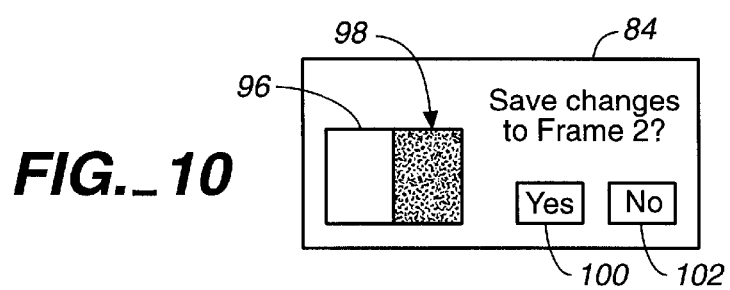
FIG._10
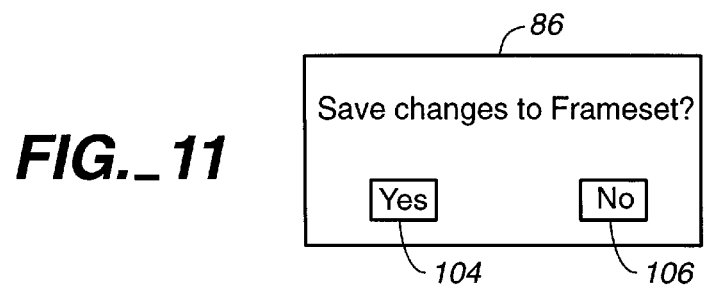
FIG._11

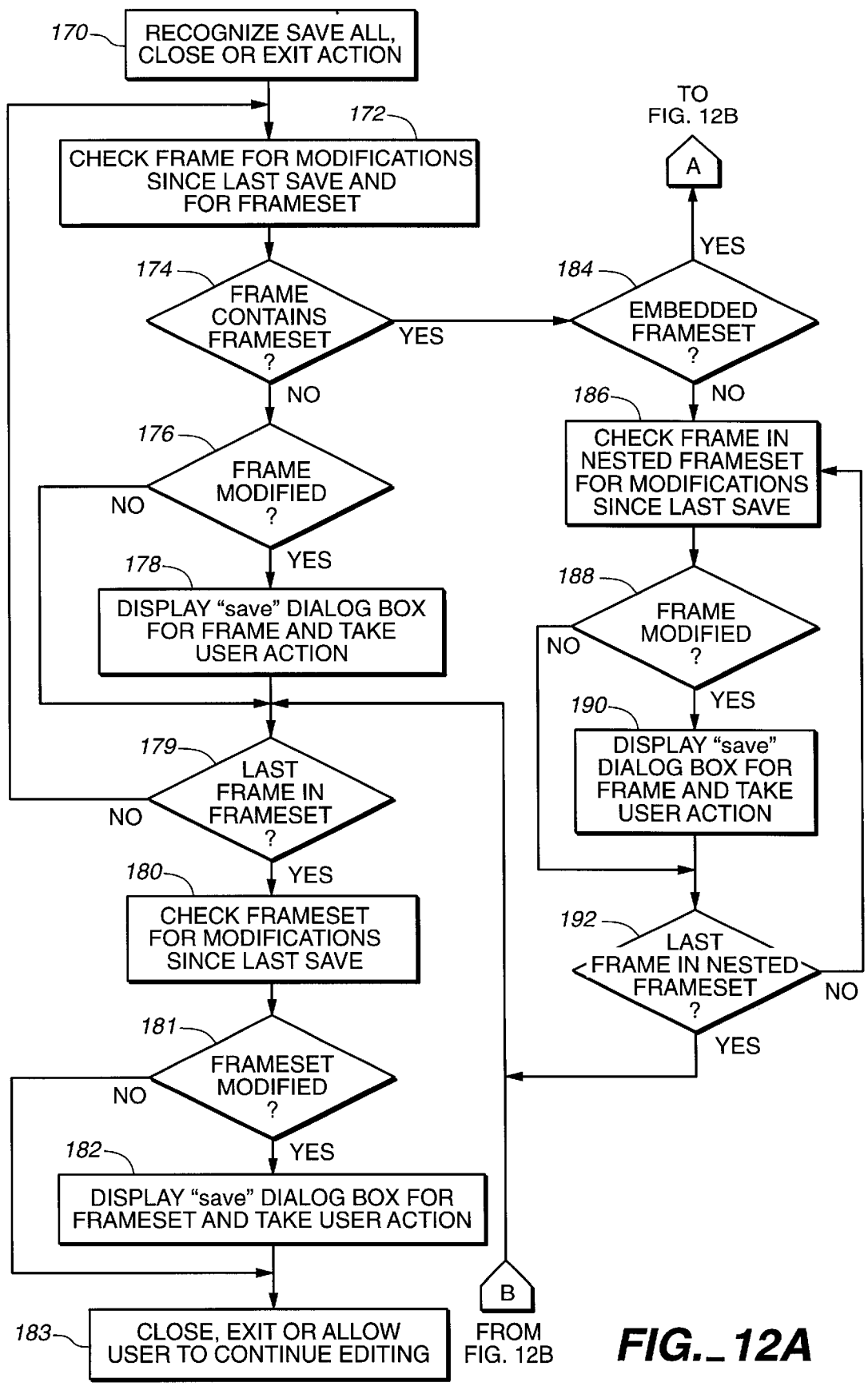
FIG._12A

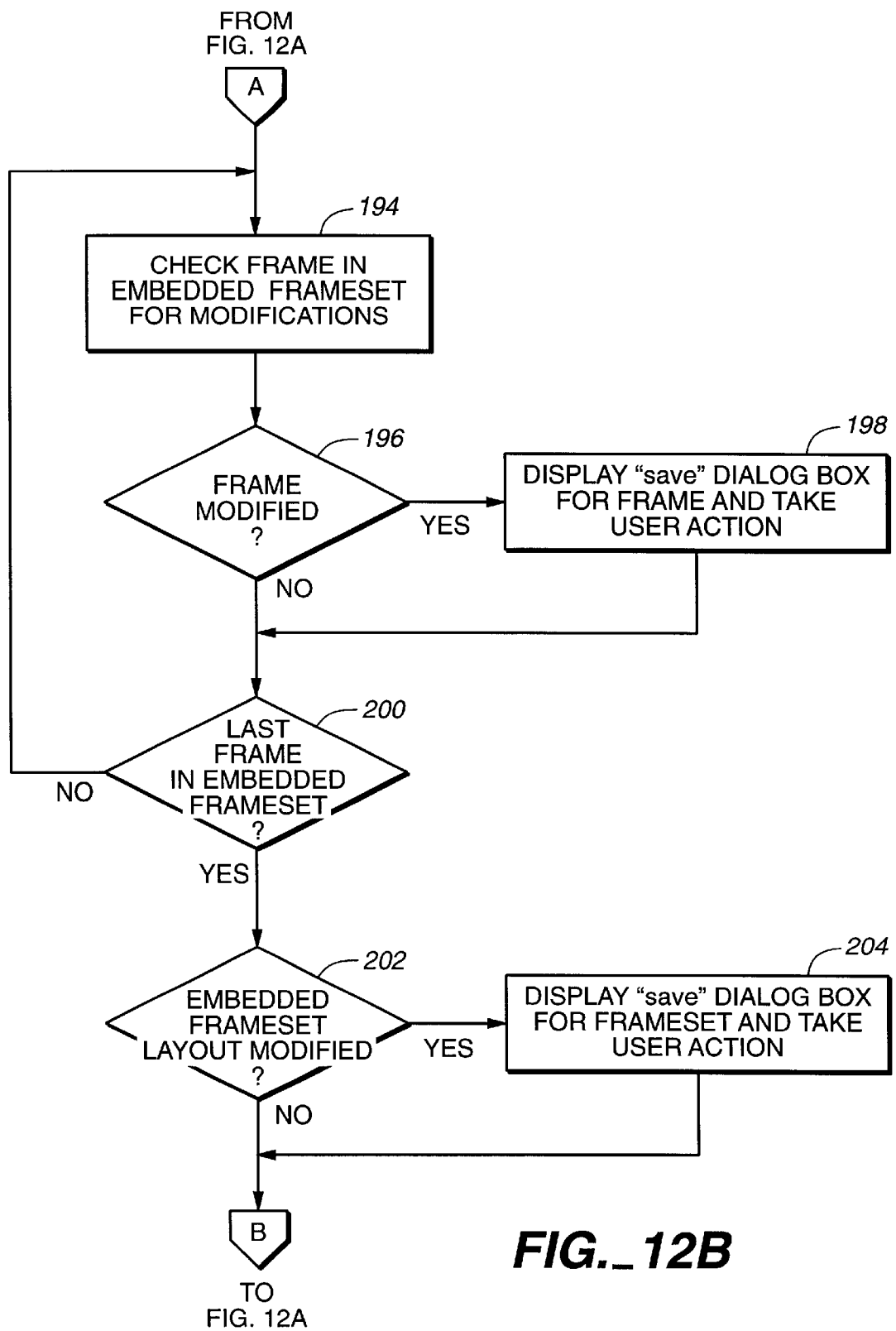
FIG._12B

CREATING AND SAVING MULTI-FRAME WEB PAGES

BACKGROUND OF THE INVENTION

The invention relates to creating multi-frame web pages.

Historically, a computer user's ability to author an interactive intranet or internet site ("web site") has depended upon the user's proficiency with Hypertext Markup Language (HTML), the language most-commonly used to define the structure and content of web pages. Creating a web page historically requires manual entry of HTML code and plain text to define the structure and content of the page and to establish hyperlinks to other computer resources. As a result, the author of a web page generally must have a relatively deep understanding of HTML.

Creation of multi-frame pages, i.e., pages divided into multiple sub-pages that display the contents of multiple intranet or internet resources, requires an even more developed understanding of HTML. Multi-frame web pages commonly are used to display, at the same time, an HTML page and the contents of another web resource, such as an HTML page, an image, or a graphics file, accessible through a hyperlink in the HTML page. Creating this type of multi-frame page requires manual entry not only of HTML code and plain text defining the HTML page, but also HTML code defining the number and layout of the multiple frames and instructing the computer to display the contents of the hyperlinked resource in a frame other than the frame displaying the HTML file.

Recent introduction of graphics-based page authoring tools has begun to simplify the creation of web sites. For example, Adobe® PageMill™ version 1.0 allowed a user to design a web page by manipulating graphical images representing the page. PageMill™ 1.0 then converted the graphical images into HTML code embodying the page.

SUMMARY OF THE INVENTION

In its various aspects, the invention represents improvements to the user interface in graphics-based page authoring tools. In one aspect, the invention allows a user to create a multiple frame web page by manipulating a graphical display representing the web page. The invention includes presenting a graphical display representing how the web page will appear when viewed through a web browser; allowing a creator of the web page to manipulate the graphical display directly to divide the web page into multiple frames; and thereafter embodying the web page in a format that can be used by the web browser to render the web page.

In another aspect, the invention allows a user to create a multiple-frame web page, one frame of which is targeted to display a particular web resource when the web page is viewed through a web browser. The invention includes presenting on a computer display a graphical image representing the frame structure of the web page; allowing a creator of the web page to target a frame by selecting a corresponding portion of the graphical display with a pointing device; and thereafter embodying the web page, including data identifying the targeted frame, in a format that can be used by the web browser to render the web page.

In another aspect, the invention allows a user to save the contents of one or more frames of a multiple-frame web page in a storage medium. The invention includes presenting on a computer monitor, for each frame to be saved, a graphical image representing the structure of the web page and including a highlighted portion representing the corresponding frame. In response to an instruction provided by the user, the contents of one or more of the frames is saved.

Advantages of the invention may include one or more of the following. A computer user with little or no understanding of the standard formats for web resources, e.g., the HTML, GIF, PDF, or Java Applet formats, may define and manipulate the layout of a multi-frame web page using graphical images. In addition, the creator of a multi-frame web page, while creating the page, sees a close facsimile of how the multi-frame page will appear when viewed through a web browser. This allows the creator to produce an aesthetically and functionally pleasing multi-frame page quickly and efficiently and eliminates any need to view the page periodically through a separate browser. The creator also may use graphical images to target a frame in the multi-frame page to display the contents of a web resource. Again, this enables a user having little or no understanding of the standard formats to create a sophisticated web page.

Furthermore, one or more "save" dialog boxes presented when a page author attempts to exit the page may give the author a quick and readily understandable graphical indication of which, if any, of the frames in the page have been altered and therefore should be saved. A "save" dialog box also may indicate, with or without a graphical representation of the web page, that the frame layout ("frameset") has been altered and therefore should be saved. The multi-frame web page may contain a simple frameset or one or more nested or embedded framesets.

Other features and advantages of the invention will become apparent from the following description and from the claims.

BRIEF DESCRIPTION OF THE DRAWINGS

FIG. 1 is a block diagram of a computer system that may be used to execute a web page authoring program.

FIGS. 2, 3 and 4 are front views of a computer display showing the creation of a multi-frame web page with the page authoring program.

FIGS. 5 and 6 are flow charts of the operation of the page authoring program during creation of a multi-frame web page.

FIGS. 7 and 8 are front views of a computer display showing the creation of a multi-frame web page with the page authoring program.

FIGS. 9, 10 and 11 are views of dialog boxes that appear on a computer display when a user attempts to exit the page authoring program without saving the changes to the page.

FIGS. 12A and 12B are flow charts of the operation of the page authoring program while saving a multi-frame web page.

DETAILED DESCRIPTION

The invention is aimed at the creation of multiple-frame web pages, as opposed to multiple document panes. The capabilities of a web page authoring program, unlike a program for generating paned documents, are limited and determined by the standard formats, such as HTML, used to embody web resources. For example, a multi-frame web page embodied in HTML code will consist of one or more framesets, each of which itself may consist of one or more framesets, including "nested" and "embedded" framesets. Furthermore, the relative layout of frames in a web page are constrained by rules governing how the frames must be specified. For example, the sizes of the frames in an HTML page may be specified on one axis only, using an absolute pixel value, a percentage value, or a relative value. Also, unlike panes in a document, frames in a web page can have descriptive labels and can display the contents of other web resources accessible through URLs (Uniform Resource Locators). A multi-frame HTML web page must be embodied in multiple HTML files, at least one containing a description of the frame layout (or "frameset"), and one for each frame containing the contents of that frame, as described below.

Referring to FIG. 1, the invention may be implemented in the form of a graphics-based page authoring program 15 containing executable instructions to be carried out in a programmable processing system 10. The system 10 includes, among other things, a processor 20, a random access memory (RAM) 21, a non-volatile memory 22 (for example, a writable read-only memory (ROM) such as a flash ROM), a hard drive controller 23, a video controller 31, a display controller 35, and an input/output (I/O) controller 24 coupled by a processor (CPU) bus 25. The system 10 may be preprogrammed, e.g., in ROM, or it may be programmed (and reprogrammed) by loading the page authoring program 15 from another source, such as a floppy disk, a CD-ROM, or another computer.

The hard drive controller 23 is coupled to a hard disk 33 suitable for storing executable computer programs, including the page authoring program 15, and data. The video controller 31 may be coupled to a video recorder (not shown), which may be used for storing and importing video footage and for writing final output. The I/O controller 24 is coupled by means of an I/O bus 26 to an I/O interface 27. The I/O interface 27 receives and transmits data (e.g., stills, pictures, movies, and animations for importing into a composition) in analog or digital form over communication links such as a serial link, local area network, wireless link, or parallel link. Also coupled to the I/O bus 26 are a display 28, a keyboard 29, a network interface card (NIC) 30, a pointing device such as a mouse 34, and a modem 32 for connecting the system 10 to another computer or to a computer network, e.g., to an Internet service provider (ISP) or an on-line service provider (OSP). Alternatively, separate connections (i.e., separate buses) may be used for some of the components connected to the I/O bus 26, including the I/O interface 27, the display 28 and the keyboard 29.

Referring to FIG. 2, the graphics-based page authoring program causes the processing system to generate a visual image of a web page 50 on the display. The visual image represents a facsimile of the actual appearance of the web page 50 as viewed through a web browser, such as Microsoft® Internet Explorer or Netscape Navigator™. Upon execution of the page authoring program, the visual image represents a blank web page 50 surrounded by a border 51. The user may enter text and graphics within the border 51 and may create links in the page 50 to other web resources.

Referring also to FIGS. 3 and 4, the user can manipulate the border 51 to create multiple frames 52, 64 in the page 50. The user activates the border 51 by providing a control command to the computer system, e.g., by executing a predefined keystroke or using the mouse to select a command from the graphical display. The user then can reposition an edge 56 of the border 51 by placing a displayed cursor 58 over the edge 56, moving ("dragging") the edge 56, and then releasing ("dropping") the edge 56 at a selected position 60. In the pictured embodiment, the border 51 remains active as long as the user continues to provide the control command, e.g., by continuing to hold down the appropriate keys, and the new position 60 of the "dragged" edge 56 is represented visually by a broken line 62 until the user drops the edge 56 and deactivates the border 51.

Once the user has selected the new position 60 of the edge 56, the page 50 is redisplayed with two frames 52, 64, one of which (frame 52) has as its border 54 a resized version of the original border 51. A new border 66 is created for the second frame 64 to encompass the area previously included within the original border 51 and now excluded from the first frame 52. The user may edit the content of the frames 52, 64 by entering text, graphics, and hyperlinks within the frames 52, 64, or the user may create one or more additional frames by repositioning an edge of one of the frames 52, 64, as described above. The user can select any of the frames for editing by placing the cursor 58 within the appropriate frame and "clicking" a mouse button.

If the user divides one of the frames 52, 64 into two frames by moving an edge of the corresponding frame border 54, 66 vertically, the divided frame 52, 64 is treated as a "nested" frameset, the frame structure of which is embodied in the frameset document for the web page, as discussed below. If the user inserts another multi-frame web page into one of the frames 52, 64, the frame 52, 64 is treated as an "embedded" frameset, which is embodied in a separate frameset document, as discussed below.

The user also may delete one the frames 52, 64. The program deletes a frame when the user activates one of the frame borders 54, 66, drags an edge of the frame border until the corresponding frame 52, 64 encompasses the frame to be deleted, and then releases the edge, as described above.

Referring again to FIG. 1, the page authoring program 15 creates and maintains a data structure 65, e.g., in RAM 21, indicating the dimensions of the frame borders and the locations of text and images within the frames. The data structure may take the form of a nested hierarchy of parent and child objects, each of which represents one of the frames. As the user manipulates the graphical image of the page, the program 15 updates the data structure 65 to reflect the creation and deletion of frames and to indicate resizing of the frame borders, as well as to preserve the addition, deletion, and relocation of text and images within the frames.

At some time before the user closes the page authoring program 15, e.g., at predetermined time periods or when the user saves the web page, the program 15 converts the data structure 65 into a standard format that may be used by a web browser to render the web page. If the HTML format is used, the program 15 converts the data structure 65 into multiple HTML files 67, one of which contains the layout of the frames in the web page, and the rest of which each contain the contents of one of the frames. For example, a data structure representing a three-frame web page in most cases would be converted into four HTML files. However, if two of the three frames were part of-an embedded frameset, the web page would be converted into five HTML files, one containing the frame structure of the web page, one containing the frame structure of the embedded frameset, and the rest each containing the contents of one of the frames. Saving a graphical representation of a web page as an HTML file is known, e.g., from Adobe® PageMill™ version 1.0. The program 15 then stores the HTML files 67 to a storage device, such as a hard disk 15, from which the HTML files 67 may be retrieved and delivered to a web browser for rendering. When the user attempts to close the page authoring program without saving changes to the page, the user is prompted with one or more "save" dialog boxes, as described below.

Referring to FIG. 5, the process of creating a new frame begins when the user takes a "new frame" action, e.g., by providing the required control command (step 120). Upon recognizing the new frame action, the page authoring program determines in which frame the pointing device is located (step 122) and then activates the corresponding frame border (step 124). An activated frame border may be indicated in the graphical display by changing the color of, or otherwise highlighting, the activated border. Once the frame border has been activated, the program allows the user to resize the corresponding frame by dragging and dropping an edge of the frame border, as discussed above (step 126). When the user ends the new frame action, e.g., by releasing the keys associated with the control command, the program immediately reads the coordinates of the pointing device to determine the new size and location of the resized frame (step 128). The program then determines the size and location of the "empty area" previously included within the resized frame by calculating the difference between the old and new coordinates of the resized frame (step 130).

Once the program has determined the size and location of the empty area, the program generates a new frame of the appropriate size to fill the empty area (step 132). The new frame is generated in a similar manner as the initial blank web page (50 in FIG. 2), the generation of which is known, e.g., from Adobe® PageMill™ version 1.0. The program then displays in the graphical display a frame border representing the new frame (step 134) and generates a frameset document containing the frame structure of the web page (step 136).

Referring to FIG. 6, the program also allows the creator of the multi-frame web page to insert the contents of an existing web resource, such as another HTML page, into one of the frames. If the inserted resource itself is a multi-frame page, the inserted page is treated as an "embedded" frameset. When the author wants to insert another web resource into the multi-frame page, the program recognizes an "insert" action performed by the author, e.g., selecting an "Insert" command from a pull-down menu and entering the source file name for the resource to be inserted (step 140). The program then checks the inserted resource to determine whether it contains a frameset definition of its own, i.e., whether the inserted resource itself is a multi-frame page (step 141). If the inserted resource is a multi-frame page (step 142), the program parses the associated frameset document to determine the frame structure of the inserted page ("the embedded frameset") (step 143), and then displays the corresponding frame layout and frame borders in the appropriate areas of the computer display (step 144). The program then displays the contents of each frame of the embedded frameset (step 145) and returns to edit mode so the author can continue editing the web page (step 146).

If the inserted resource does not contain a frameset definition (step 142), the resource is not an embedded frameset. In this situation, the program simply amends the corresponding frame reference to include the file source name of the inserted resource (step 147) and displays the contents of the inserted resource in the appropriate area of the computer display (step 148). The program then returns to edit mode to allow the user to continue editing the web page (step 147).

Referring now to FIGS. 7 and 8, by manipulating graphical images created by the page authoring program 15, the author can establish a hyperlink in the multi-frame web page to another web resource and can target one of the frames to display the contents of the web resource. The author typically creates a hyperlink between a label 70 (e.g., text or an image) in a frame 52 and a web resource (e.g., an HTML, video, graphics, or audio file) in one of two ways: (I) by using a pointing device to "drag and drop" a graphical image ("icon") 72 representing the resource from a file list 74 onto the label 70; or (ii) by using the pointing device to highlight the label 70 (e.g., by "double-clicking" on the object) and then keying a path (e.g., a Uniform Resource Locator, or "URL") to the resource into a text box 76.

After establishing the hyperlink, the author can target any frame in the multi-frame page to display the contents of the hyperlinked resource. To do so, the author enters a predetermined control command (e.g., by executing an assigned keystroke or by clicking a mouse button in an assigned area of the display), which causes the page authoring program to display a window 78 containing a miniature image 80 of the page. The author then uses the mouse to select one of the frames 52, 64 as the target frame by selecting the appropriate area 80a, 80b in the miniature image 80. The program determines which area the user has selected and creates a "target" tag identifying the selected frame 52, 64. The "target" tag is stored as part of the HTML file described above.

For example, the author of the multi-frame web page of FIG. 7 may design the first frame 52 to contain a textual description of the cultural habits of lions in the wild. Within this text, the author may embed a hyperlink to an MPEG file containing video footage of lions in the wild. The hyperlink would be represented by a label 70 in the text and would be created as discussed above. If the author wants the text and the video footage to appear side-by-side in a web browser, the author will "target" the second frame 64 to display the hyperlinked MPEG video. In other words, the author will "direct" the hyperlinked MPEG video into the second frame 64. Then, when a user viewing the web page in the browser selects the label 70 in the first frame 52, the MPEG video will be displayed in the second frame 64. The improved user interface described above allows the author to target the second frame quickly and easily.

Referring to FIGS. 9, 10 and 11, the user is prompted with one or more "save" dialog boxes 82, 84, 86 if the user attempts to exit the page authoring program or to close the web page 50 without saving changes to the page. As discussed above, a multi-frame HTML page is stored as multiple HTML files, one of which preserves the frame layout and the rest of which each preserve the contents of one of the frames. The number and content of dialog boxes that appear when the user attempts to exit without saving depends upon the extent of unsaved changes. In general, one dialog box appears for each frame that has been altered, and another dialog box appears if the layout of the frames has been altered. Therefore, if none of the frames nor the frame layout have been altered since the last save, no dialog boxes will appear; if only one frame has been altered or only the frame layout has changed, only one dialog box will appear; and if multiple frames or if one frame and the frame layout have changed, multiple dialog boxes will appear.

To illustrate, when a user creates a new, double-frame web page 50, as described above, and attempts to exit the program or close the page without saving the page 50, a first "save" dialog box 82 (FIG. 9) appears, prompting the user to save the contents of the first frame 52. Along with a standard textual prompt (e.g., "Save changes to Frame 1?") identifying the frame 52 to be saved, the dialog box 82 also includes a miniature graphical image 88 of the frame layout of the page 50. The portion 90 of the image 88 corresponding to the first frame 52 is shaded or otherwise highlighted to indicate which frame is to be saved. The dialog box 82 disappears when the user selects a standard "Yes" button 92 or "No" button 94 indicating that the user does or does not want to save the contents of the frame 52. The contents of the first frame 52 are saved to a corresponding HTML file if the user so instructs.

A second "save" dialog box 84 (FIG. 10) then appears prompting the user to save the contents of the second frame 64. Like the first dialog box 82, the second dialog box 84 includes a standard textual prompt (e.g., "Save changes to Frame 2?") identifying the frame to be saved and a miniature graphical image 96 of the page's layout. In the second dialog box 84, the portion 98 of the image 96 representing the second frame 64 is shaded or otherwise highlighted to indicate which frame is to be saved. The second dialog box 84 disappears when the user selects either the "Yes" button 100 or the "No" button 102. As before, the contents of the second frame 64 are saved if the user so instructs.

A third "save" dialog box 86 (FIG. 11) then appears, prompting the user to save the frameset. Since the frameset includes the layout of all frames 52, 64 in the page 50, the third dialog box 86 typically does not include a graphical image of the page, although an image could be included. When the third dialog box appears without a graphical image, the user immediately understands that the frameset itself, and not a particular frame, is to be saved. Like the other "save" dialog boxes, the third dialog box 86 disappears when the user selects either the "Yes" button 104 or the "No" button 106 appearing in the box 86. The frameset is saved if the user so instructs.

Referring now to FIGS. 12A and 12B, the program enters a "save" dialog routine when the user performs a "save" action, such as providing a "Save All," "Close" or "Exit" command (step 170). Upon entering the routine, the program checks one of the frames of the multi-frame page for modifications since the last save and determines whether the frame itself contains a frameset (step 172). If the frame does not contain a frameset (step 174) and has been modified since the last save (step 176), the program displays a "save" dialog box for the frame and performs the user-selected action, i.e., saving the frame or ignoring the unsaved changes (step 178). The program then determines whether the there are any other frames in the frameset (step 179) and, if so, repeats the steps above for each remaining frame. The program then checks the frameset of the multi-frame web page for modifications since the last save (step 180) and, if the frameset has been modified (step 181), displays a "save" dialog box for the frameset and performs the user-selected action (step 182). The program then returns to edit mode, closes the multi-frame page, or shuts down, depending upon which "save" action originally invoked the "save" dialog routine (step 183).

If, during its check of a frame in the multi-frame page (step 172), the program determines that any one of the frames itself includes a frameset (step 174), the program enters a subroutine to determine whether the frame contains an "embedded" frameset or a "nested" frameset (step 184). If the frameset is nested, the program checks one of the frames in the nested frameset for modifications since the last save (step 186) and, if the frame has been modified (step 188), displays a "save" dialog box for the frame and takes the user-selected action (step 190). The program then determines whether the nested frameset contains any other frames (step 192) and, if so, repeats the steps above for the remaining frames in the nested frameset. When all the frames in the nested frameset have been checked, the program returns to the "save" routine to determine whether the multi-frame document contains any other frames to save (step 179).

If the program determines during the subroutine that a particular frame is an embedded frameset (step 184), the program enters another subroutine to check the frames of the embedded frameset. First, the program checks one of the frames in the embedded frameset for modifications since the last save (step 194). If the frame has changed (step 196), the program displays a "save" dialog box for the frame and performs the user-selected action (step 198). The program then determines whether the frameset contains any other frames (step 200) and, if so, repeats the steps above for each of the remaining frames in the embedded frameset. The program then determines whether the structure of the embedded frameset has changed since the last save (step 202) and, if so, displays a "save" dialog box for the embedded frameset and performs the user-selected action (step 204). The program then returns to the "save" dialog routine to determine whether the multi-frame document contains any other frames to save (step 179). In practice, each embedded frameset could contain another nested or embedded frameset, so the subroutine of FIG. 12B could include an iterative call to the main "save" routine.

The invention may be implemented in digital electronic circuitry or in computer hardware, firmware, software, or in combinations of them. Apparatus embodying the invention may be implemented in a computer program product tangibly embodied in a machine-readable storage device for execution by a computer processor; and methods embodying the invention may be performed by a computer processor executing instructions organized into program modules to carry out the invention by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing may be supplemented by or incorporated in specially-designed ASICs (application-specific integrated circuits).

Other embodiments are within the scope of the following claims. For example, while the invention has been described in terms of HTML, it may be implemented to support any resource format that a web browser or web page editor can display, such as the SHTML, XML, SGML, GIF, PDF, PNG, and Java Applet formats. Also, while the phrase "creating a web page" has been used to describe the generation of a new web page from a blank template, the term also includes creating templates and modifying an existing web page. The invention is not limited to the creation of double-frame pages, but instead may be used to create pages having any number of frames containing objects such GIF, JPEG and PNG images, Java Applets, and other framesets ("nested" and "embedded" framesets).

The invention may be used in all types of computer systems, including DOS-based, Windows-based, Unix-based, and Macintosh systems. The invention also may be used to create pages for use on stand-alone computers or for use in computer networks, including wide and local area networks, and including intranets, internets, or the Internet.

What is claimed is:

1. A method for use in creating a multiple-frame web page, the method comprising:

presenting on a display device a browser view of the web page showing the web page as it will appear when viewed through a web browser;

allowing a creator of the web page to manipulate the browser view of the web page directly to:
  create in the browser view a new frame;
  define frame content for the new frame;
  edit any frame content displayed within each frame of the web page; and embodying the browser view as a web page in a format that can be used by the web browser to render the web page.

2. The method of claim 1, wherein the format comprises HTML.

3. The method of claim 1, further comprising requiring the creator to supply a predetermined control command before allowing the creator to manipulate the browser view of the web page.

4. The method of claim 1, wherein the display device initially includes a border enclosing the web page.

5. The method of claim 4, wherein allowing the creator to manipulate the browser view of the web page comprises allowing the creator to reposition an edge of the border.

6. The method of claim 1, wherein the browser view of the web page includes a border around each frame in the web page.

7. The method of claim 6, further comprising allowing the creator to add a frame to the web page by repositioning an edge of one of the borders.

8. The method of claim 6, further comprising allowing the creator to remove a frame from the web page by repositioning an edge of one of the borders.

9. A program, residing in a storage medium, for use in creating a multiple-frame web page, the program comprising executable instructions which enable a computer system to:
  present on a display device a browser view of the web page showing the web page as it will appear when viewed through a web browser;
  allow a creator of the web page to manipulate the browser view of the web page directly to:
    create in the browser view a new frame;
    define frame content for the new frame;
    edit any frame content displayed within each frame of the web page, wherein the frame content comprises text and graphics; and
  embody the browser view as a web page in a format that can be used by the web browser to render the web page.

10. The program of claim 9, wherein the format comprises HTML.

11. The program of claim 9, wherein the creator is required to supply a predetermined control command before being allowed to manipulate the browser view of the web page.

12. The program of claim 9, wherein the browser view of the web page initially includes a border enclosing the web page.

13. The program of claim 12, wherein the creator is allowed to manipulate the browser view of the web page by repositioning an edge of the border.

14. The program of claim 9, wherein the browser view of the web page includes a border around each frame in the web page.

15. The program of claim 14, wherein the creator is allowed to add a frame to the web page by repositioning an edge of one of the borders.

16. The program of claim 14, wherein the creator is allowed to remove a frame from the web page by repositioning an edge of one of the borders.

17. A method for use in saving a portion of a web page to a storage medium, the method comprising:
  displaying a browser view of a web page on a display device of a computer, the web page having a frameset structure;
  simultaneously displaying a miniature graphical image representing the frameset structure of the web page;
  highlighting a portion of the miniature graphical image corresponding to a frame of the web page to be saved; and
  in response to an instruction provided by a user of the computer, saving the content of the frame of the web page in the storage medium.

18. The method of claim 17, wherein the content of the frame is saved in HTML format.

19. The method of claim 17, further comprising:
  receiving an input from a user selecting a frame of the web page to be saved;
  highlighting a portion of the miniature graphical image corresponding to the user-selected frame of the web page; and
  in response to an instruction provided by the user, saving the content of the user-selected frame of the web page in the storage medium.

20. The method of claim 19, wherein the content of the user-selected frame is saved in HTML format.

21. The method of claim 17, wherein the graphical image is presented automatically if the user attempts to exit the web page without saving the portion.

22. The method of claim 21, wherein the graphical image is presented only if the portion has changed since a previous save.

23. A method for use in saving the contents of one or more frames of a multiple-frame web page in a storage medium, the method comprising:
  displaying a browser view of a web page on a display device of a computer, the web page having a frameset structure;
  for each frame in the browser view displaying frame content to be saved, displaying a miniature graphical image representing the frameset structure of the web page and highlighting a portion of the miniature graphical image corresponding to its respective frame; and
  in response to an instruction provided by a user of the computer, saving the contents of one or more of the frames in the storage medium.

24. The method of claim 23, further comprising saving less than all of the frames for which graphical images are presented.

25. The method of claim 23, further comprising saving the contents of each frame in a separate file.

26. The method of claim 25, wherein each file is an HTML file.

27. A program, residing on a storage medium, for use in saving a portion of a web page in the same or another storage medium, the program comprising executable instructions that enable a computer system to:
  display a browser view of a web page on a display device of a computer, the web page having a frameset structure;
  simultaneously display a miniature graphical image representing the frameset structure of the web page;
  highlight a portion of the miniature graphical image corresponding to a frame of the web page to be saved; and
  in response to an instruction provided by a user of the computer system, save the content of the frame of the web page in the storage medium.

28. The program of claim 27, wherein the content of the frame is saved in HTML format.

29. The program of claim 27, wherein the computer system further comprises executable instructions that enable a computer system to, receive an input from a user selecting a frame of the web page to be saved; highlight a portion of the miniature graphical image corresponding to the user-selected frame of the web page; and in response to an instruction provided by the user, save the content of the user-selected frame of the web page in the storage medium.

30. The program of claim 29, wherein the content of the user-selected frame is saved in HTML format.

31. The program of claim 27, wherein the graphical image is presented automatically if the user attempts to close the web page without saving the portion.

32. The program of claim 31, wherein the graphical image is presented only if the portion has been changed since a previous save.

33. A program, residing on a storage medium, for use in saving the contents of one or more frames of a multiple-frame web page in a storage medium, the program comprising executable instructions that enable a computer system to:

display a browser view of a web page on a display device of a computer, the web page having a frameset structure;

for each frame in the browser view displaying frame content to be saved, display a miniature graphical image representing the frameset structure of the web page and highlight a portion of the miniature graphical image corresponding to its respective frame; and in response to an instruction provided by a user of the computer, save the contents of one or more of the frames in the storage medium.

34. The program of claim 33, wherein the computer system saves less than all of the frames for which graphical images are presented.

35. The program of claim 33, wherein the computer system saves the contents of each frame in a separate file.

36. The program of claim 35, wherein each file is an HTML file.

* * * * *

UNITED STATES PATENT AND TRADEMARK OFFICE
CERTIFICATE OF CORRECTION

PATENT NO.     : 6,266,684 B1
DATED          : July 24, 2001
INVENTOR(S)    : William F. Kraus and Emily E. Clarke It is certified that error appears in the above-identified patent and that said Letters Patent is hereby corrected as shown below:

Title page,
Item [56], References Cited, U.S. PATENT DOCUMENTS, please delete "6,031,983" and insert -- 6,031,989 --.
Please insert the following document:
-- 6,025,844  *  2/2000  Parsons ……………………………….. 345/805 --
OTHER PUBLICATIONS, please insert the following document:
-- Ken Magel, "Is It Too Late to Put the User Back into HTML?", Internet Watch, 12/97 --

Signed and Sealed this

Nineteenth Day of August, 2003

JAMES E. ROGAN
*Director of the United States Patent and Trademark Office*